US011135896B2

(12) United States Patent  
Eckelberg et al.

(10) Patent No.: US 11,135,896 B2  
(45) Date of Patent: Oct. 5, 2021

(54) HEATING, VENTILATION, AND AIR CONDITIONING SYSTEM OF A WORK VEHICLE

(71) Applicant: CNH Industrial America LLC, New Holland, PA (US)

(72) Inventors: Mark Allen Eckelberg, West Fargo, ND (US); Leonid Chernyavsky, Glenview, IL (US); Thomas Allen Jangula, Fargo, ND (US)

(*) Notice: Subject to any disclaimer, the term of this patent is extended or adjusted under 35 U.S.C. 154(b) by 0 days.

(21) Appl. No.: 16/724,598

(22) Filed: Dec. 23, 2019

(65) Prior Publication Data

US 2020/0122547 A1   Apr. 23, 2020

Related U.S. Application Data

(62) Division of application No. 15/350,696, filed on Nov. 14, 2016, now Pat. No. 10,543,733.

(51) Int. Cl.
*B60H 1/00* (2006.01)
*B60H 1/32* (2006.01)

(52) U.S. Cl.
CPC ..... *B60H 1/00535* (2013.01); *B60H 1/00378* (2013.01); *B60H 1/00521* (2013.01); *B60H 1/3233* (2013.01); *B60H 2001/00221* (2013.01)

(58) Field of Classification Search
CPC ............ B60H 1/00378; B60H 1/00535; B60H 1/3233; B60H 2001/00221; B60H 1/00521

See application file for complete search history.

(56) References Cited

U.S. PATENT DOCUMENTS

| | | |
|---|---|---|
| 3,884,048 A | 5/1975 | Schneider |
| 4,095,440 A | 6/1978 | Brown et al. |
| 4,612,975 A | 9/1986 | Ikari |
| 5,911,624 A | 6/1999 | Stauffer |
| 5,921,619 A | 7/1999 | Cederberg et al. |
| 6,223,807 B1 | 5/2001 | Asche et al. |
| 6,398,294 B1 | 6/2002 | Bollweg et al. |
| 6,761,038 B1 | 7/2004 | Bushnell et al. |
| 7,069,736 B2 | 7/2006 | Kamimae et al. |

(Continued)

FOREIGN PATENT DOCUMENTS

| | | |
|---|---|---|
| EP | 2857238 A1 | 4/2015 |
| WO | 2005056320 A1 | 6/2005 |

(Continued)

OTHER PUBLICATIONS

Extended European Search Report for EP Application No. 17201386.4 dated Jul. 4, 2018 (15 pages).

*Primary Examiner* — Filip Zec
(74) *Attorney, Agent, or Firm* — Patrick Sheldrake; Peter Zacharias

(57) ABSTRACT

A heating, ventilation, and air condition (HVAC) system of a work vehicle includes a housing configured to mount to a structure of a cab of the work vehicle. The housing includes at least one mounting assembly configured to support at least one heat exchanger within the housing, and the at least one mounting assembly is configured to position the at least one heat exchanger such that the at least one heat exchanger extends through the structure from an interior of the cab to an exterior of the cab while the at least one heat exchanger is coupled to the at least one mounting assembly.

7 Claims, 9 Drawing Sheets

(56) References Cited

U.S. PATENT DOCUMENTS

| | | |
|---|---|---|
| 8,033,899 B2 | 10/2011 | Ichikawa et al. |
| 8,376,820 B2 | 2/2013 | Stough et al. |
| 8,966,921 B2 | 3/2015 | Nazario et al. |
| 8,944,201 B2 | 8/2015 | Krellner et al. |
| 2003/0045225 A1 | 3/2003 | Ruckert et al. |
| 2004/0121719 A1* | 6/2004 | Robison ............. B60H 1/00478 454/143 |
| 2006/0207275 A1 | 9/2006 | Janeling |
| 2007/0066207 A1* | 3/2007 | Smith .................. B60H 1/3226 454/69 |
| 2007/0131408 A1* | 6/2007 | Zeigler ............. B60H 1/00378 165/240 |
| 2007/0205633 A1* | 9/2007 | Waco ................ B60H 1/00378 296/190.09 |
| 2010/0126188 A1 | 5/2010 | Clark |
| 2011/0241379 A1* | 10/2011 | Obe ..................... B62D 33/067 296/190.09 |
| 2012/0208446 A1* | 8/2012 | Taylor ................. B60H 3/0616 454/158 |
| 2013/0001984 A1* | 1/2013 | Spencer ............. B60H 1/00207 296/190.09 |
| 2014/0166233 A1* | 6/2014 | Wehrenberg ....... B60H 1/00378 165/42 |
| 2015/0165875 A1* | 6/2015 | Uchida ............. B60H 1/00378 62/239 |
| 2016/0272051 A1 | 9/2016 | Hyakuda et al. |
| 2016/0311288 A1 | 10/2016 | Mayo Mayo et al. |
| 2017/0106720 A1 | 4/2017 | Gress et al. |

FOREIGN PATENT DOCUMENTS

| | | |
|---|---|---|
| WO | 2009055891 A1 | 5/2009 |
| WO | 2015065495 A1 | 5/2015 |

\* cited by examiner

HEATING, VENTILATION, AND AIR CONDITIONING SYSTEM OF A WORK VEHICLE

CROSS REFERENCE TO RELATED APPLICATIONS

This application is a divisional application of U.S. Non-Provisional application with the Ser. No. 15/350,696, filed on Nov. 14, 2016 which is hereby incorporated by reference in its entirety.

BACKGROUND

Certain work vehicles (e.g., wheel loaders, tractors, harvesters, skid steers, etc.) include a heating, ventilation, and air condition (HVAC) system configured to control an airflow into a cab of the work vehicle. For example, the HVAC system may control a flow rate of the airflow and/or a temperature of the airflow. In addition, the HVAC system may be configured to pressurize the cab to substantially reduce ingress of dirt and/or other contaminants into the cab, and/or to reduce noise within the cab. In certain work vehicles, the HVAC system is positioned beneath a seat (e.g., an operator seat) of the work vehicle. Unfortunately, in such work vehicles, the seat blocks access to the HVAC. Accordingly, the first step in performing certain maintenance operations on the HVAC system (e.g., cleaning the evaporator, cleaning the heater core, etc.) involves removing the seat. As a result, the duration and/or the costs associated with performing the maintenance operations may be increased, thereby reducing the efficiency of the HVAC maintenance process.

BRIEF DESCRIPTION

In one embodiment, a heating, ventilation, and air conditioning (HVAC) system includes a housing configured to mount to a structure of a cab of the work vehicle. The housing includes at least one mounting assembly configured to support at least one heat exchanger within the housing, and the at least one mounting assembly is configured to position the at least one heat exchanger such that the at least one heat exchanger extends through the structure from an interior of the cab to an exterior of the cab while the at least one heat exchanger is coupled to the at least one mounting assembly.

In another embodiment, an HVAC system includes a tank assembly having a tank and a drain. The tank is configured to receive an evaporator, and the drain is configured to direct water out of the tank. The HVAC system also includes a mounting assembly configured to support the tank assembly on a structure of a cab of the work vehicle. The mounting assembly is configured to position the tank assembly such that the tank extends through the structure from an interior of the cab to an exterior of the cab while the tank assembly is coupled to the mounting assembly. In addition, the drain is positioned on the exterior of the cab while the tank assembly is coupled to the mounting assembly.

In a further embodiment, an HVAC system includes a heater core and a conduit extending from the heater core. The HVAC system also includes a bleed valve directly coupled to the conduit to establish a fluid connection between the bleed valve and the heater core. The bleed valve is configured to selectively facilitate degassing of air from the heater core.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
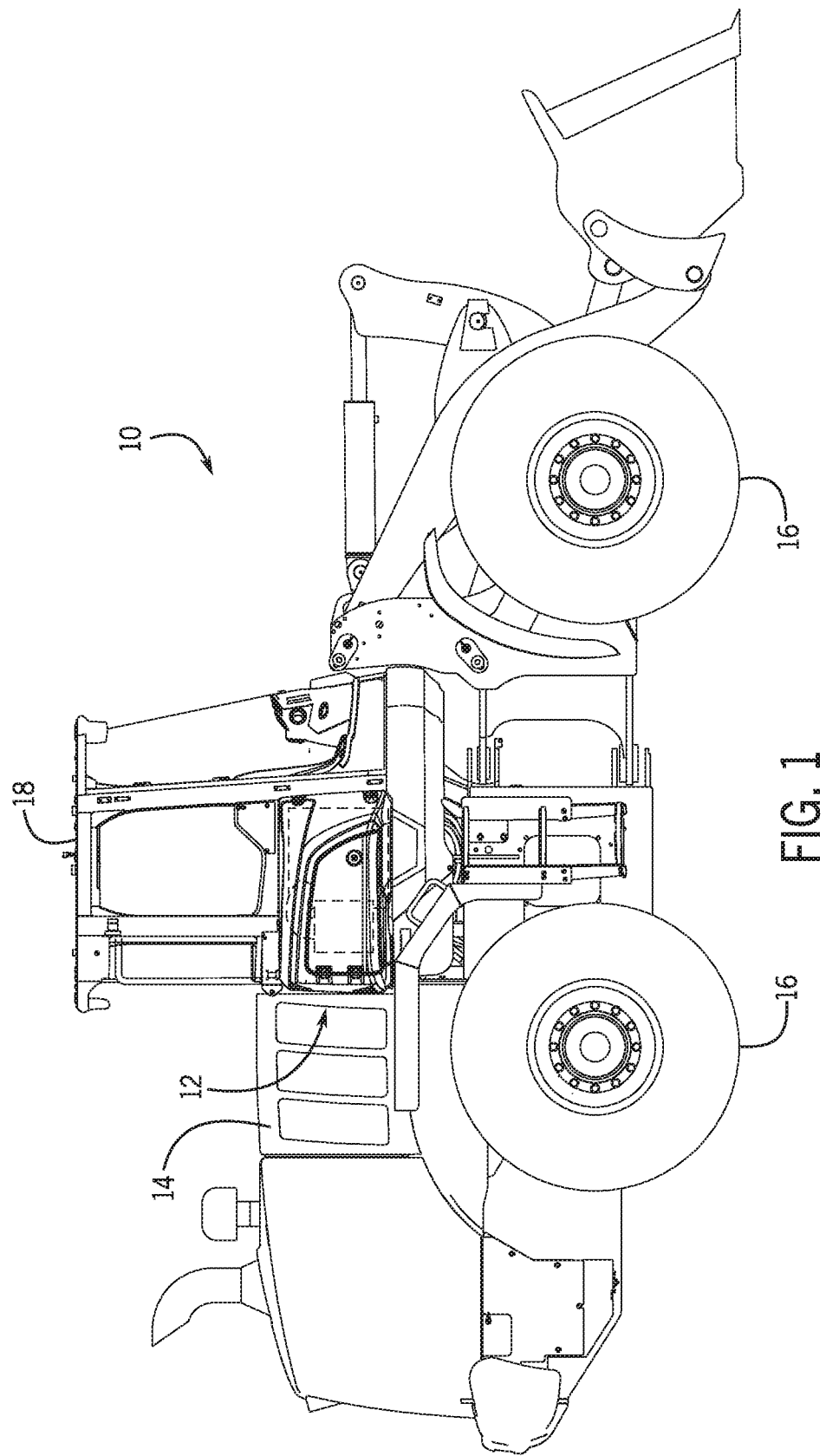
FIG. 1 is a side view of an embodiment of a work vehicle that includes a heating, ventilation, and air conditioning (HVAC) system.

Turning now to the drawings, FIG. 1 is a side view of an embodiment of a work vehicle 10 that includes a heating, ventilation, and air condition (HVAC) system 12. In the illustrated embodiment, the work vehicle 10 includes a body 14 configured to house an engine, a transmission, other systems of the work vehicle 10, or a combination thereof. In addition, the work vehicle 10 includes wheels 16 configured to be driven by the engine and transmission, thereby driving the work vehicle 10 along a field, a road, or any other suitable surface. In the illustrated embodiment, the work vehicle 10 includes a cab 18 configured to house an operator. As discussed in detail below, the HVAC system 12 is mounted to a side of the cab 18 and configured to control an air temperature within the cab and/or to pressurize the cab. Pressurizing the cab may substantially reduce ingress of dirt and/or other contaminants, enhance passenger comfort, reduce noise, or a combination thereof.

In certain embodiments, the HVAC system includes a housing configured to mount to a structure of the cab. The housing includes a mounting assembly configured to support a heat exchanger within the housing, and the mounting assembly is configured to position the heat exchanger such that the heat exchanger extends through the structure from an interior of the cab to an exterior of the cab while the heat exchanger is coupled to the mounting assembly. Arranging the heat exchanger such that the heat exchanger extends through the structure enables the heat exchanger to be removed for maintenance (e.g., cleaning, inspection, etc.) without disconnecting hoses that are fluidly coupled to the heat exchanger, thereby reducing the duration and costs associated with HVAC maintenance operations. While the illustrated work vehicle 10 is a wheel loader, it should be appreciated that the HVAC system described herein may be employed within any suitable work vehicle, such as a tractor, a harvester, a sprayer, or a skid steer, among others.

Figure 2:
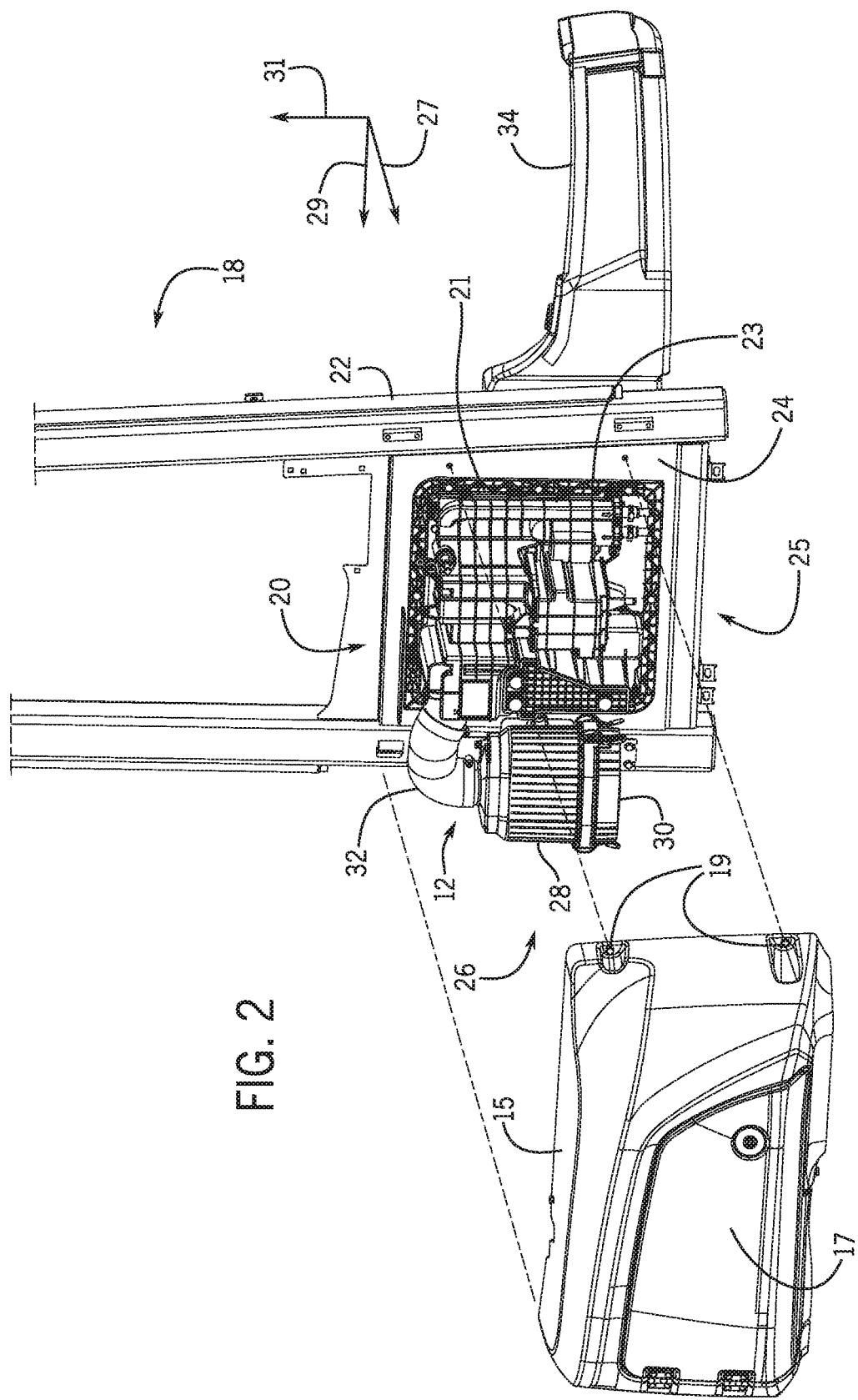
FIG. 2 is an exploded view of an embodiment of an HVAC system that may be employed within the work vehicle of FIG. 1.

FIG. 2 is an exploded view of an embodiment of an HVAC system 12 that may be employed within the work vehicle of FIG. 1. In the illustrated embodiment, the HVAC system 12 includes an outer cover 15 and a housing 20. The outer cover 15 is configured to be disposed over the housing 20 to enhance the aesthetic appearance of the work vehicle. In the illustrated embodiment, the outer cover 15 includes a door 17 configured to selectively facilitate access to a portion of the housing 20 (e.g., an access panel on the housing that facilitates access to a recirculation air filter, etc.). In certain embodiments, the door may be omitted, and the outer cover may be removed from the cab to facilitate access to the housing. Furthermore, the outer cover 15 may be removed to facilitate removal of a cover portion of the housing, thereby facilitating access to internal components of the HVAC system 12. In the illustrated embodiment, the outer cover 15 is coupled to the cab 18 by fasteners 19. However, it should be appreciated that in alternative embodiments, the outer cover 15 may be coupled to the cab 18 by any other suitable connection(s), such as a pivot joint and a latch, multiple latches, or hook and loop fastener(s), among others.

In the illustrated embodiment, the housing 20 is mounted to a frame 22 of the cab 18 via a mounting plate 24. As discussed in detail below, the housing 20 includes a first portion 21 configured to mount to the mounting plate 24, and a second portion (e.g., cover portion) 23 configured to selectively couple to the first portion 21. Accordingly, the second portion 23 may be selectively removed from the first portion 21 to facilitate access to an interior of the housing 20. For example, the second portion 23 may be removed before performing maintenance operations on certain components within the housing 20. As illustrated, the second portion 23 is positioned on an external side 25 of the mounting plate 24 relative to the cab 18 (e.g., on the exterior of the cab). While the illustrated housing 20 is coupled to the mounting plate 24 in the illustrated embodiment, it should be appreciated that in alternative embodiments, the housing may be coupled directly to the frame 22. In further embodiments, the housing may be coupled to any other suitable structure of the cab 18.

In the illustrated embodiment, the housing 20 is positioned on a lateral side of the cab 18. Accordingly, the housing 20 extends along a lateral axis 27 through the mounting plate 24 and the frame 22 from an interior of the cab 18 to an exterior of the cab 18. In alternative embodiments, the housing may be positioned on an opposite lateral side of the cab, on a longitudinal side of the cab (e.g., on a front side of the cab or on a rear side of the cab), or on a vertical side of the cab (e.g., on the roof of the cab). If the housing is positioned on a longitudinal side of the cab, the housing may extend along a longitudinal axis 29 through a respective cab structure from the interior of the cab to the exterior of the cab. In addition, if the housing is positioned on a vertical side of the cab, the housing may extend along a vertical axis 31 though a respective cab structure from the interior of the cab to the exterior of the cab.

In the illustrated embodiment, the HVAC system 12 includes a filter assembly 26 configured to receive air from the external environment (e.g., the environment external to the cab 18) and to direct the air into the housing 20. The filter assembly 26 includes a canister 28 configured to house a filter, a lid 30 configured to enable a user to remove and replace the filter, and a hose 32 configured to direct the airflow from the filter to the housing 20. While the filter assembly 26 is disposed outside the housing 20 in the illustrated embodiment, it should be appreciated that in alternative embodiments, the filter assembly may be integrated with the housing. In addition, the HVAC system 12 includes a flow passage 34 configured to direct air from the housing 20 to the interior of the cab 18. For example, the flow passage 34 may receive heated or cooled air from the housing and direct the heated or cooled air to the interior of the cab. While the illustrated embodiment includes a single flow passage, it should be appreciated that in alternative embodiments, the HVAC system may include more flow passages (e.g., 2, 3, 4, 5, 6, or more) to direct the heated or cooled air to various regions within the interior of the cab.

Figure 3:
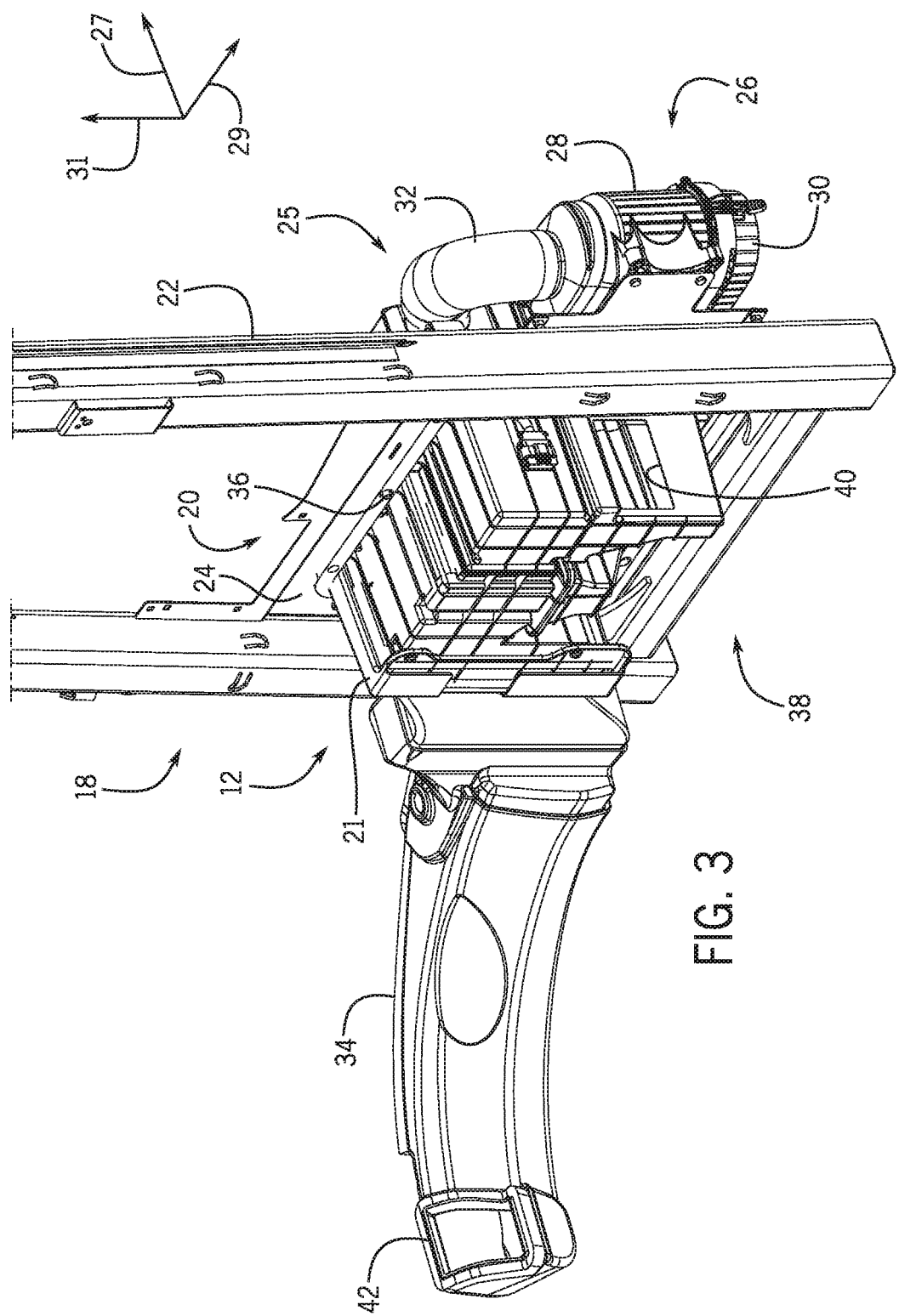
FIG. 3 is a perspective view of the HVAC system of FIG. 2.

FIG. 3 is a perspective view of the HVAC system 12 of FIG. 2. As illustrated, the first portion 21 of the housing 20 is coupled to the mounting plate 24 with fasteners 36. In certain embodiments, the first portion 21 of the housing 20 includes a slot configured to receive the mounting plate 24. With the mounting plate 24 disposed within the slot, openings in the mounting plate 24 may be aligned with openings in the first portion 21 of the housing 20. Fasteners 36 may be disposed through the openings to couple the first portion 21 of the housing 20 to the mounting plate 24, thereby coupling the housing 20 to the frame 22 of the cab 18. As illustrated, most of the first portion 21 of the housing 20 is positioned on an interior side 38 of the mounting plate 24 (e.g., within an interior of the cab). Accordingly, the first portion 21 of the housing 20 extends along the lateral axis 27 from the mounting plate 24 into the interior of the cab 18. In the illustrated embodiment, the first portion 21 of the housing 20 includes a recirculation opening 40 configured to receive air from the interior of the cab and to facilitate recirculation of the air back into the cab interior. In addition, the flow passage 34 includes an outlet 42 configured to output air from the housing into the interior of the cab. While the illustrated embodiment includes one recirculation opening and one outlet, it should be appreciated that in alternative embodiments, the HVAC system may include more recirculation openings and/or outlets.

Figure 4:
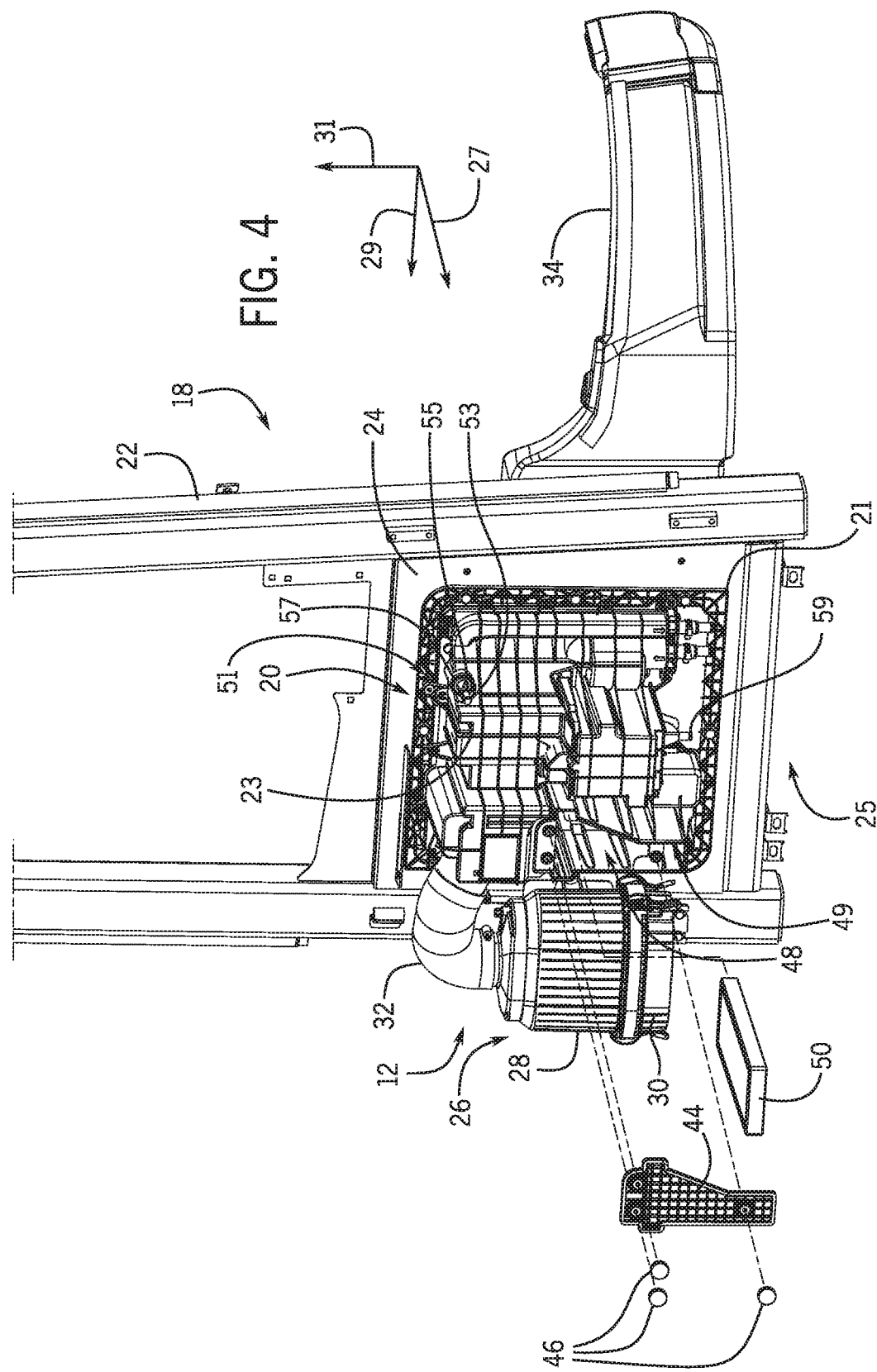
FIG. 4 is an exploded view of the HVAC system of FIG. 2, in which a recirculation filter panel is removed.

FIG. 4 is an exploded view of the HVAC system 12 of FIG. 2, in which a recirculation filter panel 44 is removed. In the illustrated embodiment, the recirculation filter panel 44 is removably coupled to the second portion 23 of the housing 20 by fasteners 46. However, it should be appreciated that in alternative embodiments, the recirculation filter panel may be coupled to the housing by any other suitable connector(s), such as a pivot joint and a latch, multiple latches, or hook and loop fastener(s), among others. As illustrated, the recirculation filter panel 44 is configured to enclose a recirculation chamber 48, which receives recirculation air from the recirculation opening 40. The recirculation chamber 48 directs the recirculation air from the recirculation opening 40 through a recirculation filter 50. As discussed in detail below, the recirculation air then combines with fresh air before the combined air flows through a blower. In addition, dust and/or other debris, which is blocked by the recirculation filter 50, may collect within a dust collection region 49 of the recirculation chamber 48. To remove and replace the recirculation filter 50 and to clean the dust collection region 49, the door of the outer cover may be opened, or the outer cover may be removed. Next, the recirculation filter panel 44 may be removed by uncoupling the fasteners 46, and the recirculation filter 50 may be removed and replaced, and/or the dust collection region 49 may be cleaned. The recirculation filter panel 44 may then be coupled to the housing using the fasteners, and the door of the outer cover may be closed, or the outer cover may be coupled to the cab. The recirculation filter 50 and the dust collection region 49 may substantially reduce dust and/or other contaminants from being recirculated into the cab 18. In certain embodiments, the recirculation cover panel may be omitted, and the second portion of the housing may be removed to access the recirculation filter and/or the dust collection region.

In the illustrated embodiment, the HVAC system 12 includes a bleed valve 51. The bleed valve 51 is configured to selectively facilitate degassing of air from a heater core. In the illustrated embodiment, the bleed valve 51 includes a clamp 53 disposed on a conduit, such as the illustrated hose 55, which extends to the heater core. However, it should be appreciated that in alternative embodiments, the bleed valve may include any other suitable type of valve, such as a ball valve or a needle valve, among others. In addition, while a hose extends from the heater core in the illustrated embodiment, it should be appreciated that in alternative embodiments, any other suitable type of conduit (e.g., a rigid pipe, etc.) may extend from the heater core. In such embodiments, the bleed valve may be directly coupled to the conduit. In the illustrated embodiment, the second portion 23 of the housing 20 includes an opening 57 configured to facilitate passage of the hose 55 through the housing 20, thereby enabling the bleed valve 51 to be positioned outside the housing 20. Accordingly, to remove air from a coolant loop that includes the heater core (e.g., while filling the coolant loop with coolant), the outer cover may be removed, and the bleed valve 51 may be opening to facilitate degassing. Because the bleed valve 51 is positioned outside the housing 20, the second portion 23 of the housing 20 may remain coupled to the first portion during the degassing process. However, it should be appreciated that in certain embodiments, the bleed valve may be positioned inside the housing.

In certain embodiments, the HVAC system includes an evaporator and a tank assembly. The evaporator is configured to cool the airflow into the cab, thereby enhancing occupant comfort (e.g., during warmer months). The tank assembly includes a tank configured to receive and to support the evaporator. The tank is configured to collect water that condenses on the outside of the evaporator. In the illustrated embodiment, the tank assembly includes a drain 59, which is the only drain on the tank assembly. As illustrated, the drain 59 is positioned on the external side 25 of the mounting plate 24 (e.g., on the exterior of the cab). Accordingly, water collected with the tank may be expelled through the drain 59 to the external environment (e.g., toward the ground). As illustrated, a portion of the tank extends through the second portion 23 of the housing, thereby positioning the drain 59 outside the housing 20. While the illustrated embodiment includes a single drain 59, it should be appreciated that in alternative embodiments, the tank assembly may include additional drains (e.g., positioned on the exterior of the cab).

Figure 5:
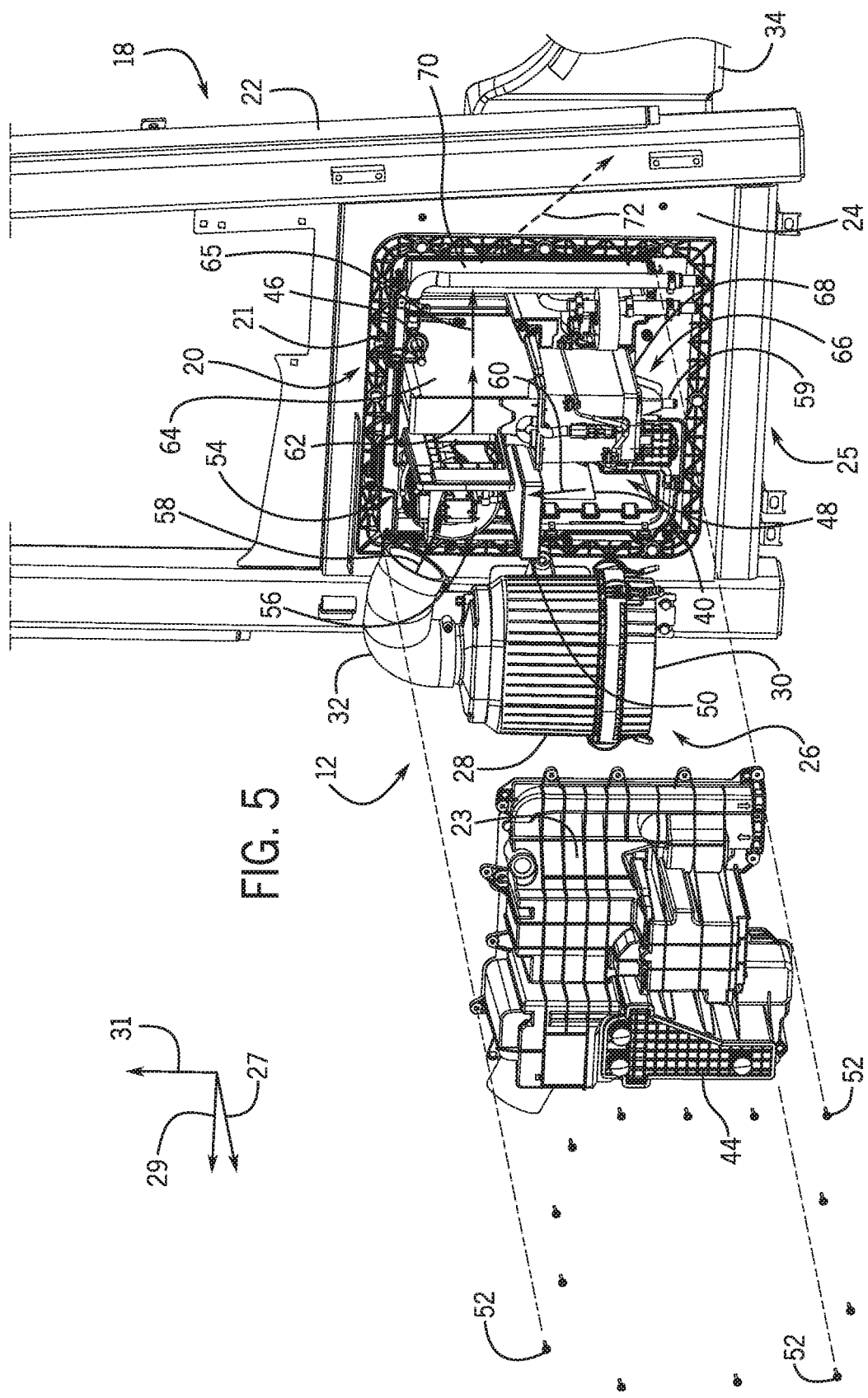
FIG. 5 is an exploded view of the HVAC system of FIG. 2, in which a cover portion of a housing is removed.

FIG. 5 is an exploded view of the HVAC system 12 of FIG. 2, in which the second portion 23 (e.g., cover portion) of the housing 20 is removed. In the illustrated embodiment, the second portion 23 of the housing 20 is removably coupled to the first portion 21 of the housing 20 by fasteners 52, thereby forming a substantially water-tight seal between the housing portions. However, it should be appreciated that in alternative embodiments, the second portion may be coupled to the first portion by any other suitable connector (s), such as a pivot joint and a latch, multiple latches, or hook and loop fastener(s), among others. With the second portion 23 of the housing 20 removed from the first portion 21 of the housing, access is provided to certain components within the interior of the housing 20, thereby facilitating HVAC maintenance operations. Because the HVAC components may be accessed by removing the outer cover and the second portion 23 of the housing, the duration and costs associated with HVAC maintenance operations may be significantly reduced, as compared to performing maintenance operations on an HVAC system positioned beneath a seat, in which the seat is removed to provide access to the HVAC system.

In the illustrated embodiment, the HVAC system 12 includes a blower assembly 54 having a blower 56. The blower 56 is configured to receive fresh air 58 from the hose 32 of the filter assembly 26 and to receive recirculation air 60 from the recirculation chamber 48. In addition, the blower 56 is configured to output a combined airflow 62, which includes a mixture of the fresh air and the recirculation air. The blower assembly 54 is configured to pressurize the cab 18, thereby substantially reducing ingress of dirt and/or other contaminants into the cab, and/or reducing noise within the cab. For example, the blower assembly 54 may establish a pressure of about 4-6 mm of water within the cab 18, thereby obviating a separate pressurization blower. In addition, the size of the recirculation opening 40 may be particularly selected to control the mixture of fresh and recirculation air, thereby controlling the cab pressurization. In certain embodiments, the size of the recirculation opening may be adjustable to control the mixture of fresh and recirculation air. For example, a valve, such as a flapper valve or a butterfly valve, at the recirculation opening may control the flow of recirculation air into the recirculation chamber, thereby controlling the mixture of fresh and recirculation air.

The combined airflow 62 flows through an evaporator 64 (e.g., heat exchanger) of a cooling system. Within the evaporator 64, evaporating refrigerant cools the airflow 62, thereby producing a chilled airflow 65. The chilled airflow 65 may be directed through the flow passage 34 to the interior of the cab, thereby enhancing occupant comfort (e.g., during warmer months). In the illustrated embodiment, the HVAC system 12 includes a tank assembly 66 having a tank 68 configured to receive and to support the evaporator 64. The tank 68 is configured to collect water that condenses on the outside of the evaporator 64. The tank assembly 66 also includes a drain 59, and, in the illustrated embodiment, the drain 59 is the only drain on the tank assembly 66. As illustrated, the drain 59 is positioned on the external side 25 of the mounting plate 24 (e.g., on the exterior of the cab). Accordingly, water collected with the tank 68 may be expelled through the drain 59 to the external environment (e.g., toward the ground). In certain embodiments, the tank 68 is configured to contain the water while the work vehicle is tilted 30 degrees about the longitudinal axis 29, and 30 degrees about the lateral axis 27. However, it should be appreciated that in further embodiments, the tank may be configured to contain water while the work vehicle is tilted at a steeper or shallower angle. Because the drain of the illustrated tank assembly is positioned on the exterior of the cab, the cost and/or complexity of the tank assembly may be reduced, as compared to tank assemblies that include at least one drain positioned on the interior of the cab and hose(s) configured to direct water from the interior drain(s) to the external environment.

The airflow 65 from the evaporator 64 flows through a heater core 70 (e.g., heat exchanger), thereby generating an output airflow 72 having a temperature greater than the airflow 65. The heater core 70 is configured to receive hot coolant from the engine (e.g., via a coolant loop) and to transfer heat from the coolant to the airflow, thereby generating a heated airflow that may enhance occupant comfort (e.g., during colder months). The heater core 70 and the evaporator 64 are typically operated independently. For example, to generate a chilled airflow, the cooling system may be activated, and coolant flow to the heater core may be blocked. In addition, to generate a heated airflow, the coolant may be provided to the heater core, and the cooling system may be deactivated. In certain embodiments, the evaporator may be omitted, and the air may flow directly from the blower to the heater core.

Figure 6:
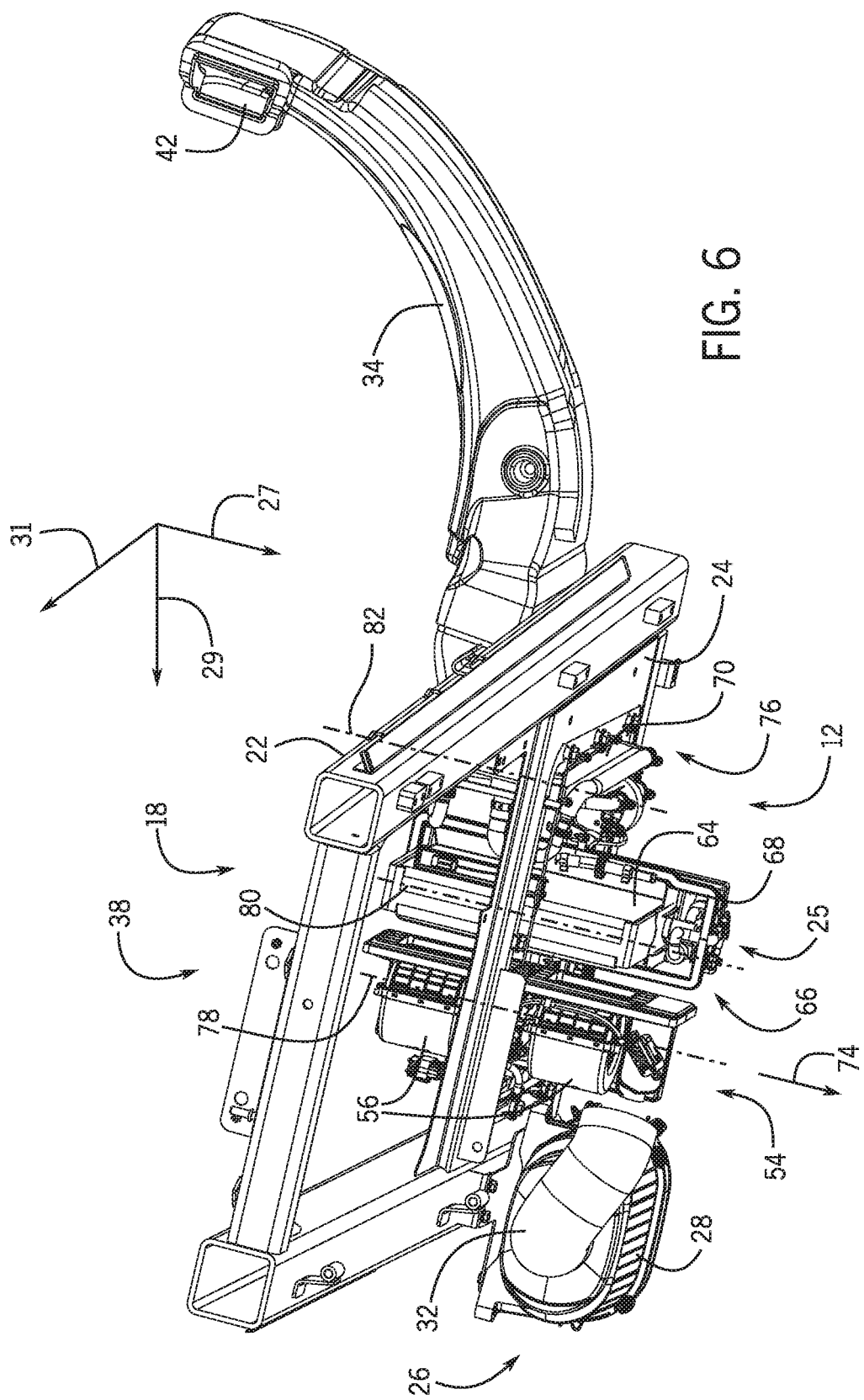
FIG. 6 is a perspective view of the HVAC system of FIG. 2, in which the housing is omitted.

FIG. 6 is a perspective view of the HVAC system 12 of FIG. 2, in which the housing is omitted. As illustrated, the blower assembly 54 is positioned such that the blower assembly 54 extends through the mounting plate 24 and the cab frame 22 (e.g., structure) from the interior of the cab (e.g., the interior side 38 of the mounting plate 24) to the exterior of the cab (e.g., the external side 25 of the mounting plate 24). In addition, the evaporator 64 and the tank assembly 66 are positioned such that the evaporator 64 and the tank assembly 66 extend through the mounting plate 24 and the cab frame 22 (e.g., structure) from the interior of the cab (e.g., the interior side 38 of the mounting plate 24) to the exterior of the cab (e.g., the external side 25 of the mounting plate 24). Furthermore, the heater core 70 is positioned such that the heater core 70 extends through the mounting plate 24 and the cab frame 22 (e.g., structure) from the interior of the cab (e.g., the interior side 38 of the mounting plate 24) to the exterior of the cab (e.g., the external side 25 of the mounting plate 24). Because the blower assembly 54, the evaporator 64, the tank assembly 66, and the heater core 70 extend through the structure of the cab, the blower assembly 54, the evaporator 64, the tank assembly 66, and the heater core 70 may be removed from the second portion of the housing via translation in a direction 74 (e.g., toward the exterior of the cab) along the lateral axis 27. In certain embodiments, the hoses coupled to the evaporator 64 and/or the heater core 70 have sufficient length to facilitate removal of the evaporator and/or the heater core without disconnecting the hoses.

For example, to clean, repair, or inspect the evaporator and/or the heater core, the outer cover of the HVAC system is removed, and the first portion of the housing is removed. The evaporator and/or the heater core are then removed from the second portion of the housing via translation toward the exterior of the cab. Once extracted from the second portion of the housing, the evaporator and/or the heater core may be cleaned, repaired, inspected, or a combination thereof. Accordingly, the duration and/or costs associated with HVAC maintenance may be significantly reduced, as compared to HVAC systems in which the evaporator and/or the heater core are disposed within the cab, and hoses are disconnected to facilitate extraction of the evaporator and/or the heater core. In the illustrated embodiment, the housing is disposed within an opening 76 in the mounting plate 24, and the blower assembly 54 (e.g., a lateral axis 78 of the blower assembly 54), the evaporator 64 (e.g., a lateral axis 80 of the evaporator/tank assembly), the tank assembly 66 (e.g., a lateral axis 80 of the evaporator/tank assembly), and the heater core 70 (e.g., a lateral axis 82 of the heater core 70) are oriented substantially perpendicular to a plane of the opening 76. However, in alternative embodiments, the lateral axis of at least one of the blower assembly, the evaporator/tank assembly, and the heater core may be oriented about 20 degrees to about 160 degrees, about 30 degrees to about 150 degrees, about 45 degrees to about 135 degrees, about 60 degrees to about 120 degrees, or about 75 degrees to about 105 degrees relative to the plane of the opening.

Figure 7:
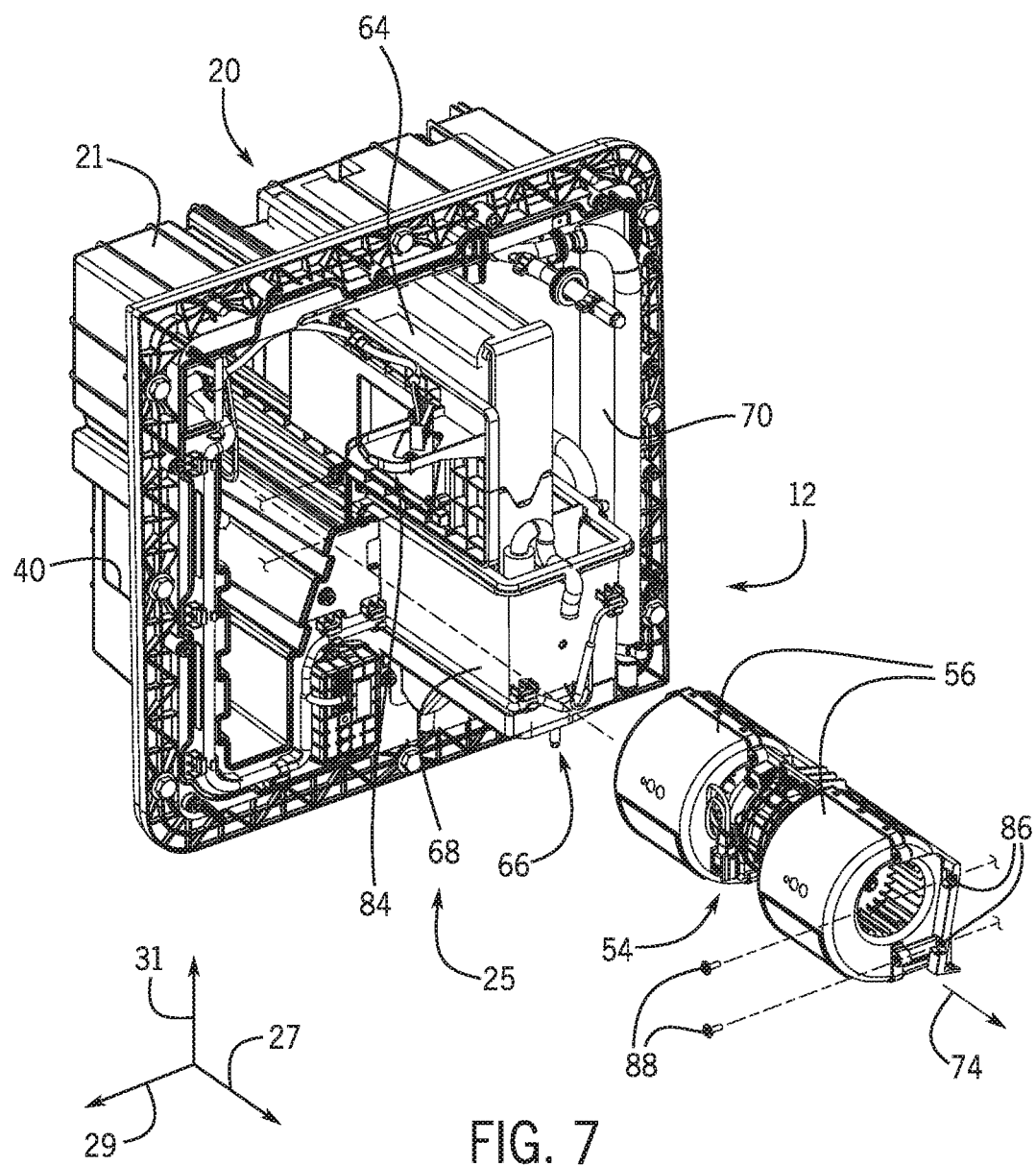
FIG. 7 is an exploded view of a portion of the HVAC system of FIG. 2, in which a blower assembly is removed.

FIG. 7 is an exploded view of a portion of the HVAC system 12 of FIG. 2, in which the blower assembly 54 is removed. In the illustrated embodiment, the blower assembly 54 is configured to couple to a blower mounting assembly 84 of the housing 20. While the blower mounting assembly 84 includes a mounting plate in the illustrated embodiment, it should be appreciated that in alternative embodiments, the blower mounting assembly may include any other suitable type of mounting system (e.g., a mounting arm, a housing, etc.). As illustrated, the blower assembly 54 includes openings 86 configured to receive fasteners 88 (e.g., of the blower mounting assembly 84). The fasteners 88 are configured to extend through the openings blower 86 and corresponding openings within the blower mounting assembly 84 to secure the blower assembly 54 to the blower mounting assembly 84. To remove the blower assembly 54 from the housing 20 (e.g., after removing the outer cover), the second portion of the housing may be removed from the first portion 21, and the fasteners 88 may be removed. The blower assembly 54 may then be removed via translation of the blower assembly 54 in the direction 74 along the lateral axis 27. In certain embodiments, electrical conductor(s) coupled to the blower assembly may have sufficient length to facilitate removal of the blower assembly. However, in alternative embodiments, connector(s), which connect the electrical conductor(s) to the blower assembly, may be removed before the blower assembly is extracted from the housing. With the blower assembly out of the housing, the blower assembly may be cleaned, inspected, repaired, or a combination thereof.

Figure 8:
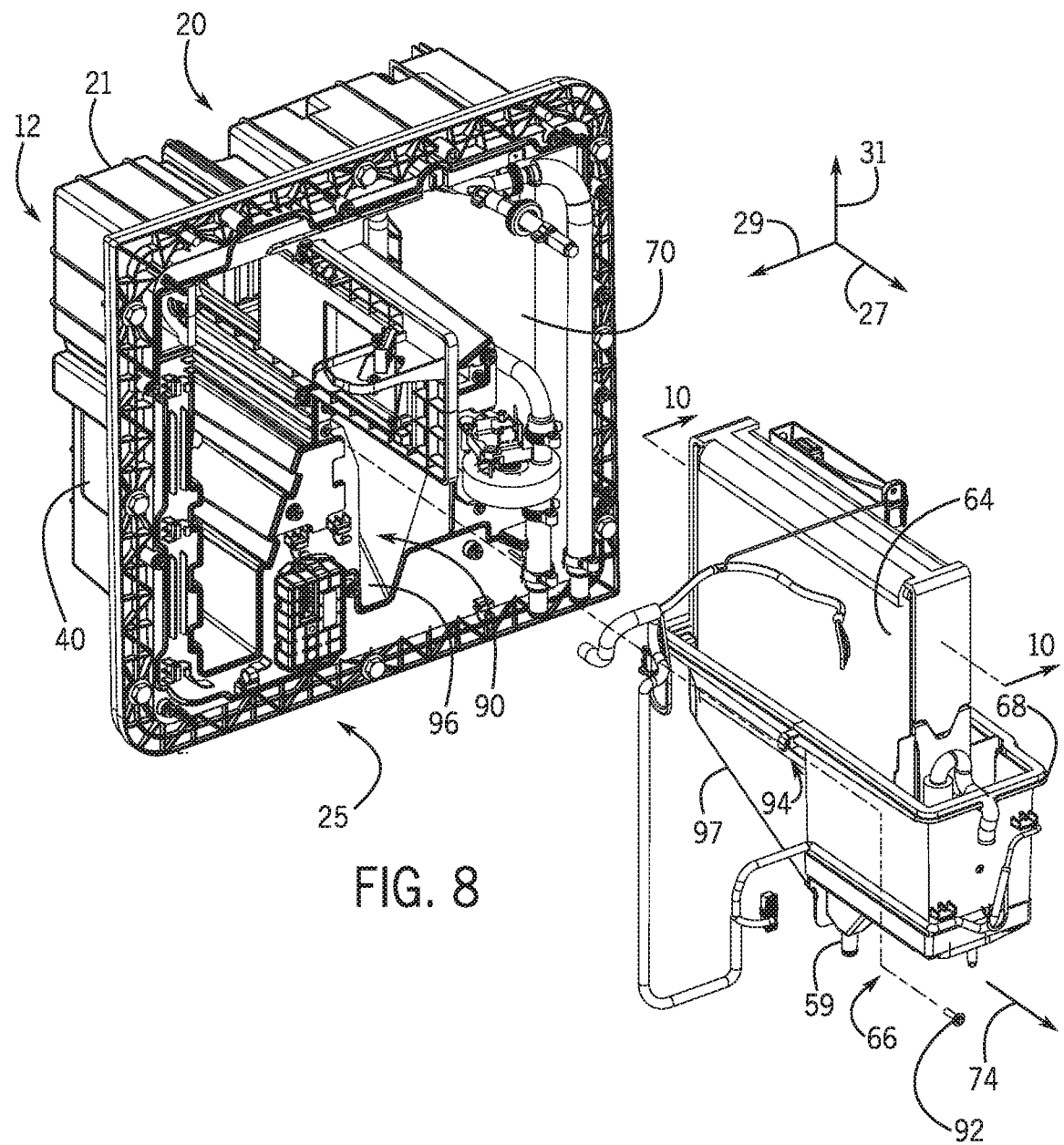
FIG. 8 is an exploded view of a portion of the HVAC system of FIG. 2, in which an evaporator and a tank assembly are removed.

FIG. 8 is an exploded view of a portion of the HVAC system 12 of FIG. 2, in which the evaporator 64 and the tank assembly 66 are removed. In the illustrated embodiment, the evaporator 64 is disposed within the tank 68 of the tank assembly 66, and the tank 68 is configured to support the evaporator 64. In certain embodiments, the evaporator is coupled to the tank assembly to secure the evaporator and the tank assembly to one another. In the illustrated embodiment, the tank assembly 66 is configured to couple to a tank mounting assembly 90 within the housing 20. The tank mounting assembly 90 includes fasteners 92 configured to selectively couple the tank assembly 64 to the first portion 21 of the housing 20. As illustrated, the fasteners 92 are configured to extend through openings 94 in the tank 68 and corresponding openings in the first portion 21 of the housing 20 to secure the tank assembly 66 to the housing 20. In addition, the tank mounting assembly 90 includes an angled surface 96 configured to contact an angled portion 97 of the tank 68 to support the tank assembly 66 within the housing 20. However, it should be appreciated that in alternative embodiments, the mounting assembly may include any other suitable type of mounting system (e.g., including a mounting plate, at least one latch, hook and loop fastener(s), rail(s), etc.). The tank mounting assembly 90 is configured to position the tank assembly 66 such that the tank 68 and the evaporator disposed within the tank 68 extend through the structure (e.g., mounting plate, cab frame, etc.) of the cab from an interior of the cab to an exterior of the cab while the tank assembly 66 is coupled to the tank mounting assembly 90.

To remove the evaporator 64 and the tank assembly 66 from the housing 20 (e.g., after removing the outer cover), the second portion of the housing may be removed from the first portion 21, and the fasteners 94 may be removed. The tank assembly 66 and the evaporator 64 may then be removed via translation of the tank assembly 66 in the direction 74 along the lateral axis 27. In the illustrated embodiment, the hoses (e.g., refrigerant hoses) coupled to the evaporator 64 have sufficient length to facilitate removal of the evaporator 64 from the first portion 21 of the housing without disconnecting the hoses. Accordingly, the duration and/or costs associated with HVAC maintenance may be significantly reduced, as compared to HVAC systems in which the evaporator is disposed within the cab and hoses are disconnected to facilitate extraction of the evaporator. With the evaporator and the tank assembly out of the housing, the evaporator and/or the tank assembly may be cleaned, inspected, repaired, or a combination thereof. While the evaporator is disposed within the tank in the illustrated embodiment, it should be appreciated that in alternative embodiments, the tank assembly may be omitted, and the housing may include a mounting assembly configured to directly support the evaporator.

Figure 9:
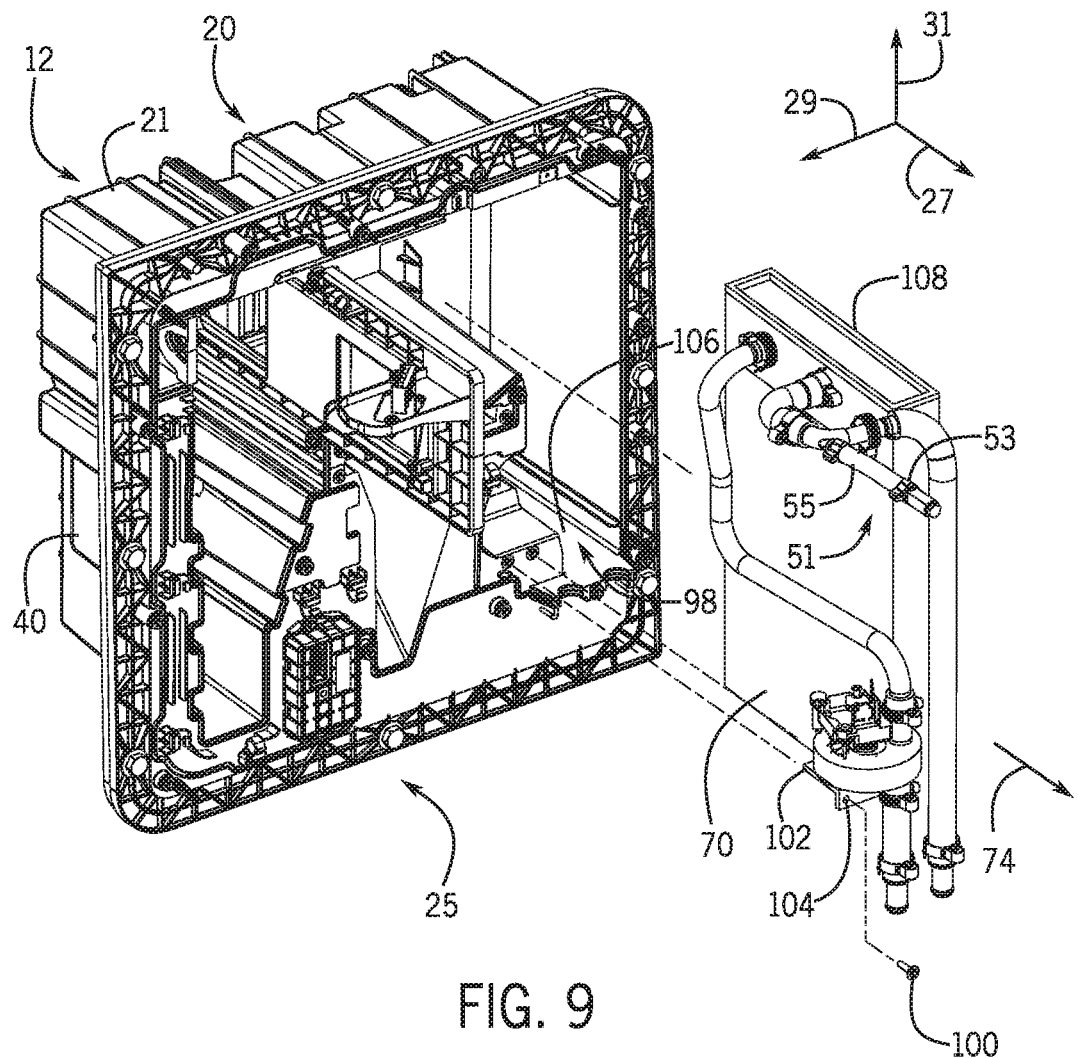
FIG. 9 is an exploded view of a portion of the HVAC system of FIG. 2, in which a heater core is removed.

FIG. 9 is an exploded view of a portion of the HVAC system 12 of FIG. 2, in which a heater core 70 is removed. In the illustrated embodiment, the heater core 70 is configured to couple to a heater core mounting assembly 98 within the housing 20. The heater core mounting assembly 98 includes fasteners 100 configured to selectively couple a mount 102, which is coupled to the heater core 70, to the first portion 21 of the housing 20. As illustrated, the fasteners 100 are configured to extend through openings 104 in the mount 102 and corresponding openings in the first portion 21 of the housing 20 to secure the heater core 70 to the housing 20. In addition, the heater core mounting assembly 98 includes a support surface 106 configured to contact a gasket 108, which is disposed about the heater core 70, to support the heater core 70 within the housing 20. However, it should be appreciated that in alternative embodiments, the mounting assembly may include any other suitable type of mounting system (e.g., including a mounting plate, at least one latch, hook and loop fastener(s), rail(s), etc.). In addition, while the gasket 108 is disposed about the heater core 70 in the illustrated embodiment, it should be appreciated that in alternative embodiments, the gasket may be omitted. The heater core mounting assembly 98 is configured to position the heater core 70 such that the heater core 70 extends through the structure (e.g., mounting plate, cab frame, etc.) of the cab from an interior of the cab to an exterior of the cab while the heater core 70 is coupled to the heater core mounting assembly 98.

To remove the heater core 70 from the housing 20 (e.g., after removing the outer cover), the second portion of the housing may be removed from the first portion 21, and the fasteners 100 may be removed. The heater core 70 may then be removed via translation in the direction 74 along the lateral axis 27. In the illustrated embodiment, the hoses (e.g., coolant hoses) coupled to the heater core 70 have sufficient length to facilitate removal of the heater core 70 from the first portion 21 of the housing without disconnecting the hoses. Accordingly, the duration and/or costs associated with HVAC maintenance may be significantly reduced, as compared to HVAC systems in which the heater core is disposed within the cab, and hoses are disconnected to facilitate extraction of the heater core. With the heater core out of the housing, the heater core may be cleaned, inspected, repaired, or a combination thereof.

As previously discussed, the HVAC system 12 includes a bleed valve 51 configured to selectively facilitate degassing of air from the heater core 70. As illustrated, the hose 55 extends from the heater core 70, and the bleed valve 51 is directed coupled to the hose 55 to establish a fluid connection between the bleed valve 51 and the heater core 70. The bleed valve 51 is directly coupled to the hose 55 extending from a top portion of the heater core 70 because, in certain embodiments, the top portion of the heater core 70 is positioned above (e.g., vertically above along the vertical axis 31) a fill point of a coolant loop, which includes the heater core 70. Accordingly, the bleed valve 51 may be positioned above (e.g., vertically above along the vertical axis 31) the fill point of the coolant loop. Indeed, the bleed valve 51 may be positioned at or near the highest point (e.g., along the vertical axis 31) of the coolant loop. In the illustrated embodiment, the bleed valve 51 includes a clamp 53 disposed on the hose 55. The clamp 53 is configured to selectively crimp the hose 55 to block fluid flow (e.g., air, coolant, etc.) from the hose 55. To remove air from the coolant loop (e.g., while filling the coolant loop with coolant), the outer cover may be removed, and the bleed valve 51 may be opening to facilitate degassing. The bleed valve 51 may then be closed to block fluid flow from the hose 55 to the external environment.

Figure 10:
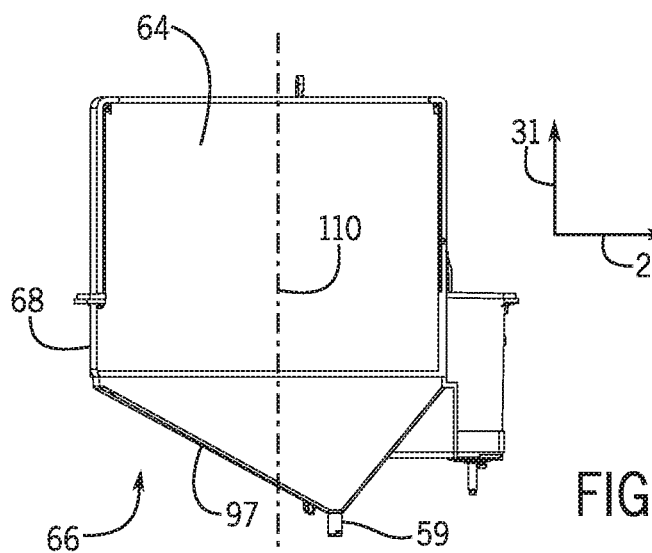
FIG. 10 is a cross-sectional view of the evaporator and the tank assembly of FIG. 8, taken along line 10-10.

FIG. 10 is a cross-sectional view of the evaporator 64 and the tank assembly 66 of FIG. 8, taken along line 10-10. As previously discussed, the tank 68 is configured to receive and to support the evaporator 64. In addition, the tank 68 is configured to collect water that condenses on the outside of the evaporator 64. The angled portion 97 of the tank 68 is configured to direct water to the drain 59, and the drain 59 is configured to expel the water to the external environment (e.g., toward the ground). In the illustrated embodiment, the drain 59 is offset from a vertical centerline 110 of the tank 68 along the lateral axis 27, thereby positioning the drain on the exterior of the cab. Because the drain of the illustrated tank assembly is positioned on the exterior of the cab, the cost and/or complexity of the tank assembly may be reduced, as compared to tank assemblies that include at least one drain positioned on the interior of the cab and hose(s) configured to direct water from the interior drain(s) to the external environment.

While only certain features have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A heating, ventilation, and air conditioning (HVAC) system of a work vehicle, comprising:
    a tank assembly comprising a tank and a drain, wherein the tank is configured to receive an evaporator, and the drain is configured to direct water out of the tank; and
    at least one fastener configured to connect the tank assembly to a structure of a cab of the work vehicle to support the tank assembly, wherein the at least one fastener is configured to position the tank assembly such that at least a first portion of the tank is positioned in an interior of the cab and that the tank extends laterally through the structure from the interior of the cab to an exterior of the cab while the tank assembly is coupled to the at least one fastener;
    wherein the drain is positioned on the exterior of the cab.

2. The HVAC system of claim 1, wherein the bottom surface of the tank comprises an angled portion extending downward to the drain such that water collected from inside the cab will flow past the structure to the drain.

3. The HVAC system of claim 2, comprising a housing wherein the at least one fastener is configured to mount the tank to a portion of the housing, wherein the housing is mounted to the structure, the housing comprising an angled housing surface configured to contact the angled portion of the tank to support the tank assembly within the housing.

4. The HVAC system of claim 1, wherein the drain is the only drain on the tank assembly.

5. The HVAC system of claim 3, wherein the at least one fastener is configured to mount the tank to a first portion of the housing and configured to enable the tank assembly to be selectively removed from the housing via lateral translation toward the exterior of the cab.

6. The HVAC system of claim 5, wherein the housing comprises: the first portion configured to mount to the structure of the cab such that at least some of the first portion is positioned in the interior of the cab;
 a second portion configured to mount to the first portion such that the second portion is positioned on an exterior of the cab, wherein the first portion and the second portion define an interior space of the housing while the second portion is mounted to the first portion.

7. The HVAC system of claim 1, wherein the drain is offset from a vertical centerline of the tank along a lateral axis.

* * * * *